United States Patent
Baus

(10) Patent No.: US 8,821,061 B2
(45) Date of Patent: Sep. 2, 2014

(54) FORWARD LOCKING PULL PIN

(75) Inventor: Romy Baus, Rubicon, WI (US)

(73) Assignee: Pivot Point, Incorporated, Hustisford, WI (US)

( * ) Notice: Subject to any disclaimer, the term of this patent is extended or adjusted under 35 U.S.C. 154(b) by 6 days.

(21) Appl. No.: 13/495,263

(22) Filed: Jun. 13, 2012

(65) Prior Publication Data
US 2013/0336719 A1 Dec. 19, 2013

(51) Int. Cl.
*F16B 21/00* (2006.01)

(52) U.S. Cl.
USPC .................... 403/322.2; 411/348; 403/DIG. 6

(58) Field of Classification Search
USPC ...................... 411/347–349; 292/60, 62, 175; 403/322.2, 325, 324, 328, 408.1, 403/DIG. 6; 24/607, 453
See application file for complete search history.

(56) References Cited

U.S. PATENT DOCUMENTS

| | | | |
|---|---|---|---|
| 1,020,637 A | 3/1912 | Chausse | |
| 3,052,940 A * | 9/1962 | Sellers | 411/555 |
| 3,430,305 A * | 3/1969 | Geffner | 24/603 |
| 3,468,169 A | 9/1969 | Welch | |
| 3,514,819 A | 6/1970 | Hill et al. | |
| 3,596,554 A * | 8/1971 | Low et al. | 411/348 |
| 3,847,422 A * | 11/1974 | Gulistan | 292/60 |
| 4,088,355 A | 5/1978 | Dey | |
| 4,252,006 A * | 2/1981 | Swisher | 70/34 |
| 4,635,327 A | 1/1987 | Netznik | |
| 4,712,395 A * | 12/1987 | Agbay | 70/34 |
| 5,586,852 A * | 12/1996 | Ganter | 411/353 |
| 5,784,760 A | 7/1998 | Leitzke et al. | |
| 6,076,867 A | 6/2000 | Dollman et al. | |
| D431,181 S | 9/2000 | Leitzke et al. | |
| 6,135,693 A | 10/2000 | Leitzke et al. | |
| 6,299,223 B1 | 10/2001 | Ji et al. | |
| 6,331,091 B2 * | 12/2001 | Cross | 403/322.2 |
| 6,655,720 B2 | 12/2003 | Rampen | |
| 6,746,058 B2 | 6/2004 | Kienzler | |
| 6,872,039 B2 | 3/2005 | Baus et al. | |
| 6,884,013 B2 | 4/2005 | Kiviranta et al. | |

(Continued)

FOREIGN PATENT DOCUMENTS

EP 1471266 10/2004

OTHER PUBLICATIONS

Webpage, www.carrlane.com, Hand-Retractable Plungers, Dated Feb. 9, 2012, 4 pages.

(Continued)

*Primary Examiner* — Joshua Kennedy
(74) *Attorney, Agent, or Firm* — Ryan Kromholz & Manion, S.C.

(57) ABSTRACT

A pull pin is configured to lock in a forward position to prevent accidental or undesirable retraction of the pull pin. The pull pin has a housing, a pull pin shaft, an inner shaft, a first and second spring, and at least one ball bearing. The housing has a ball locking space, which holds the ball bearing between the locking space and a ball aperture formed in the pull pin shaft to thereby lock the pull pin shaft in the forward position. Only upon the application of an external force to the inner shaft, which aligns a ball release portion with the ball aperture, can the ball bearing move into the ball release portion and thereby move out of said locking space, allowing for the retraction of the pull pin shaft.

20 Claims, 8 Drawing Sheets

(56) References Cited

U.S. PATENT DOCUMENTS

| | | | |
|---|---|---|---|
| 6,893,184 B2* | 5/2005 | Mills et al. | 403/322.2 |
| 7,147,420 B2 | 12/2006 | Baus et al. | |
| 7,198,306 B2 | 4/2007 | Ambs | |
| 7,255,020 B2 | 8/2007 | Thomeczek et al. | |
| 7,393,168 B2 | 7/2008 | Wei | |
| 7,731,465 B2 | 6/2010 | Stapulionis et al. | |
| 7,914,225 B2* | 3/2011 | Hageman | 403/322.2 |
| 8,516,732 B2* | 8/2013 | Burnsed, Jr. | 42/85 |
| 2007/0003365 A1* | 1/2007 | Walt et al. | 403/362 |
| 2008/0003077 A1 | 1/2008 | Anderson | |
| 2009/0214319 A1 | 8/2009 | Bolleboom | |
| 2010/0109348 A1 | 5/2010 | Boutaghou | |
| 2011/0008128 A1 | 1/2011 | Soltis et al. | |
| 2012/0009043 A1 | 1/2012 | Osborne et al. | |

OTHER PUBLICATIONS

Webpage, www.vlier.com, Quick Release Devices—Pull Ring Plungers, Dated Feb. 9, 2012, 5 pages.

Webpage, www.fairfieldproducts.thomasnet-navigator.com, Fast-Lock Quick Release Pull Pins, Dated Feb. 9, 2012, 2 pages.

* cited by examiner

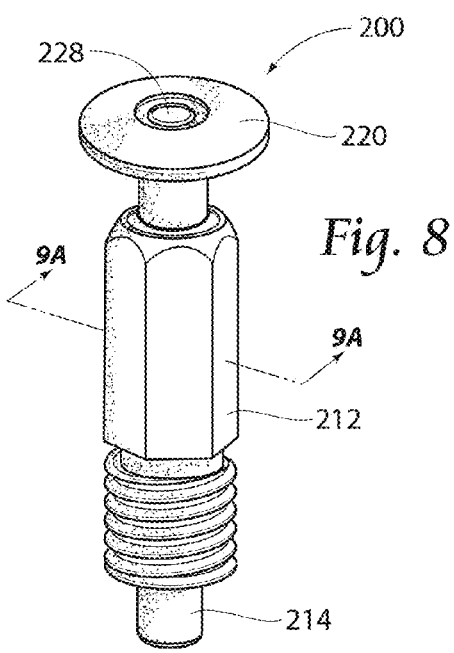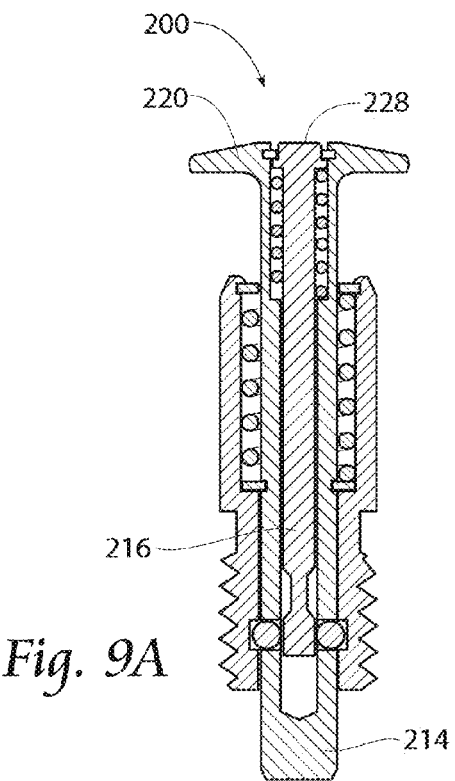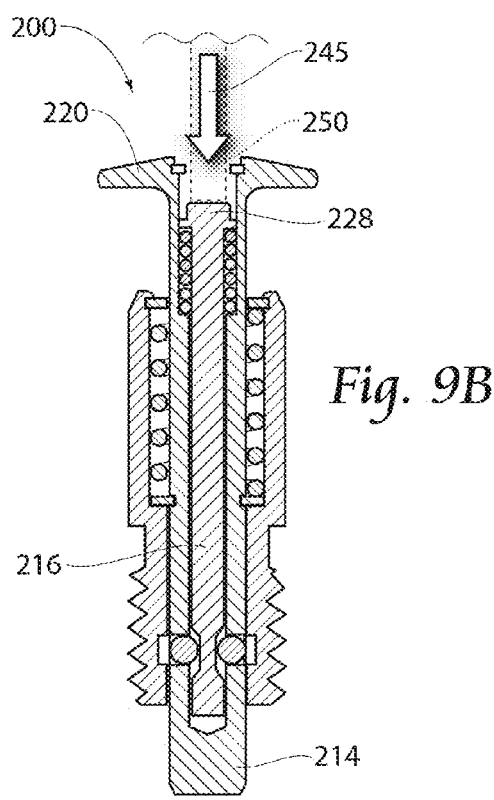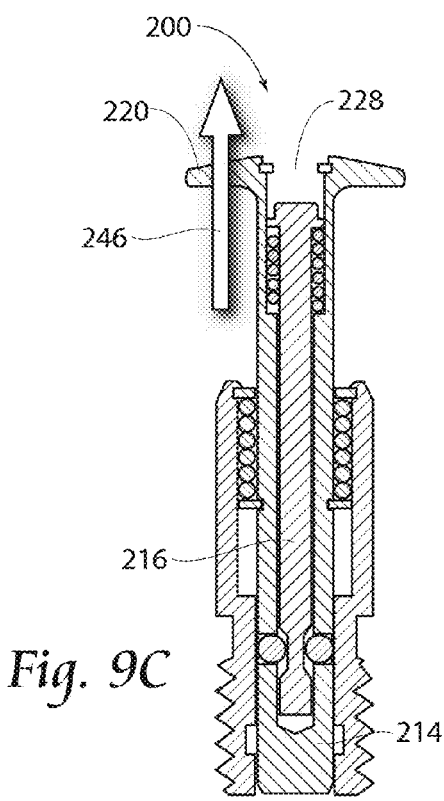

FORWARD LOCKING PULL PIN

BACKGROUND OF THE INVENTION

The present invention relates generally to non threaded fasteners that may be used to adjustably attach two materials or items. In particular, the present invention relates to pull pins that lock in a forward position. Pull pins are generally used for applications where items or materials slide proximal to one another and adjustments are made as to their positioning relative to each other. Some applications for pull pins may include telescopic legs having adjustable heights, adjustable tubing, and safety gates having adjustable widths, as an example. A pull pin is generally threaded through a hole in a first surface or material, with the pin shaft portion extending through a hole in the second material. The second material generally has a plurality of spaced apart holes. The pull pin shaft may be pulled by a handle or other pulling mechanism to retract the pin from a first hole in the second material, thereby releasing the material and allowing for adjustment. When in a desired position, the pull pin may be released, by a biasing force in the forward direction, to engage the pin shaft in a second hole to lock the materials in a second position.

Pull pins are well-known in the art, however, present pull pin designs have some deficiencies which limit their usefulness and longevity. For example, in time, the holes on the adjusting material (the second material) may become worn and misshaped. Instead of remaining circular, holding the pin snugly in place, the hole may become elongated. Furthermore, the surfaces surrounding the hole may become beveled. As such, the pull pin shaft can be easily forced in and collapsed, thereby releasing the engagement between the two materials. As such, there remains a need for a pull pin that locks in the forward position so as to prevent the undesirable inward pushing of the pull pin shaft, until a certain action is applied to the pull pin which releases the lock and allows the pin shaft to be retracted.

SUMMARY OF THE INVENTION

The invention provides a forward locking pull pin and a method for using the forward locking pull pin.

In one aspect of the invention, the forward locking pull pin includes a housing having an engagement portion and a body portion, and being substantially hollow and cylindrical about a main axis, and also having an inner surface, an outer surface, a top end and a bottom end, wherein each of the top end and the bottom end has an opening formed therein; a pull pin shaft that is substantially hollow and cylindrical about the main axis, wherein at least a portion of the pull pin shaft is contained within the housing and at least a second portion extends through the opening in the bottom end of the housing; an inner shaft that is substantially cylindrical about the main axis, wherein at least a portion of the inner shaft is contained within the pull pin shaft and at least a second portion extends through the opening in the top end of the housing; a first biasing means positioned within the housing for biasing the pull pin shaft in a forward direction, the forward direction being in opposition to a retraction direction; a second biasing means positioned within the pull pin shaft for biasing the inner shaft; a pull mechanism configured to allow manipulation of the pull pin shaft in the retraction direction; and at least one ball bearing; the inner surface of the housing further having at least one locking space formed therein, capable of holding at least a portion of at least one ball bearing; the pull pin shaft further having at least one ball aperture formed therethrough, configured such that when the pull pin is in the first forward position, at least one ball aperture is radially and vertically aligned with at least one locking space and capable of holding at least a second portion of at least one ball bearing, thereby locking the pull pin in a first forward position; the inner shaft further having a ball release section radially aligned with the ball aperture, wherein the ball release section is a narrowed portion of the inner shaft configured to accommodate receiving the ball bearings when the ball release section is vertically aligned with the ball aperture and the locking space; and wherein the pull pin is configured such that an external force applied to the inner shaft, in a direction opposing the second biasing means, moves the ball release section into vertical alignment with at least one ball aperture, allowing the ball bearing to move into the ball release portion and out of at least one locking space, and thereby allowing the pull pin shaft to move into at least a second retracted position.

The pull pin may include at least a pair of the locking spaces, at least a pair of the ball apertures, at least a pair of the ball release portions, and at least a pair of the ball bearings.

The pull pin may include an engagement portion having a diameter that is less than the diameter of the body portion.

The pull pin may include a body portion having a hexagonical cross-section.

The pull pin may include a washer covering the opening in the top end of the housing.

The pull pin may include a washer that is retained in position by a swedged portion of the top end of the housing.

The pull pin may include a washer that is retained in position by a circlip positioned atop the washer and engaged in a groove formed in the inner surface of the housing near the top end.

The pull pin may include a first biasing means that is positioned above the pull pin shaft containing the second biasing means such that the biasing means are in a stacked configuration relative to one another.

The pull pin may include a first biasing means that is positioned around the pull pin shaft containing the second biasing means, such that the biasing means are in a nested configuration relative to one another.

The pull pin may include a second biasing means that biases the inner shaft in the forward direction, and wherein the external force is applied in the retraction direction.

The pull pin may include a ball release portion of the inner shaft that is located vertically below the ball aperture of the pull pin shaft, such that when the external force is applied, the ball release portion aligns with the ball aperture.

The pull pin may include a second biasing means that biases the inner shaft in the retraction direction, and wherein the external force is applied in the forward direction.

The pull pin may include a ball release portion of the inner shaft that is located vertically above the ball aperture of the pull pin shaft, such that when the external force is applied, the ball release portion aligns with the ball aperture.

The pull pin may include a pull pin shaft that is moved in the retraction direction by a second external force applied to the pull pin shaft in the retraction direction.

The pull pin may include means for locking the pull pin in a retracted position that is achieved when the pull pin shaft is moved in the retraction direction.

The pull pin may include means for locking the pull pin in the retracted position having at least one extended portion of the housing extending above the upper end of the main body, wherein the pull mechanism is capable of twistable movement when in the retracted position to situate the pull mechanism vertically above the extended portion, such that the pull mechanism is prohibited by the extended portion from movement in the forward direction.

The pull pin may include means for locking the pull pin in the retracted position having at least one second locking space formed into the housing such that when the pull pin shaft reaches the retracted position and the external force is removed, at least one ball bearing moves into the second locking space, thereby preventing movement of the pull pin shaft in the forward direction.

The invention also provides a method of using a forward locking pull pin comprising the steps of providing a forward locking pull pin comprising a housing, a pull pin shaft, an inner shaft, a first biasing means positioned within the housing for biasing the pull pin shaft in a forward direction, the forward direction being in opposition to a retraction direction, a second biasing means positioned within the pull pin shaft for biasing the inner shaft, at least one ball bearing, and a pull mechanism, the housing having at least one locking space formed therein, the pull pin shaft having at least one ball aperture formed therethrough, and the inner shaft having a ball release section radially aligned with the ball aperture, as described above and configured such that an external force applied to the inner shaft moves the ball release section into vertical alignment with at least one ball aperture, allowing the pull pin shaft to move into at least a second retracted position; applying the external force to the inner shaft in order to move the ball release section into vertical alignment with at least one ball aperture; and moving the pull pin shaft into the retracted position.

The method may further include applying the external force in the forward direction.

The method may further include applying a second external force in the retraction direction to the pull pin shaft.

The method may further include applying an external force in the retraction direction.

The method may further include continuing to apply the external force in retraction direction to the inner shaft.

The method may further include locking the pull pin shaft in the retracted position.

BRIEF DESCRIPTION OF THE DRAWINGS

FIG. 8 is perspective view of a fourth embodiment of a forward locking pull pin according to the present invention.

FIGS. 9A-9C are cross-sectional views of the fourth embodiment of a forward locking pull pin according to the present invention shown in FIG. 8.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
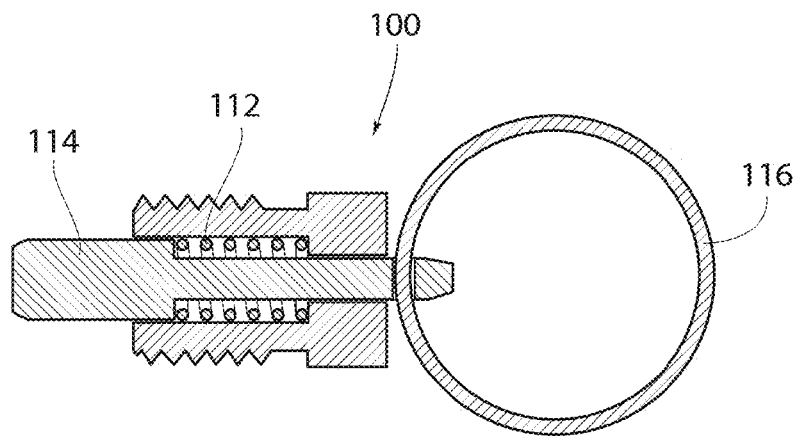
FIG. 1 is a cross-sectional view of a pull pin according to the prior art.
Figure 2:
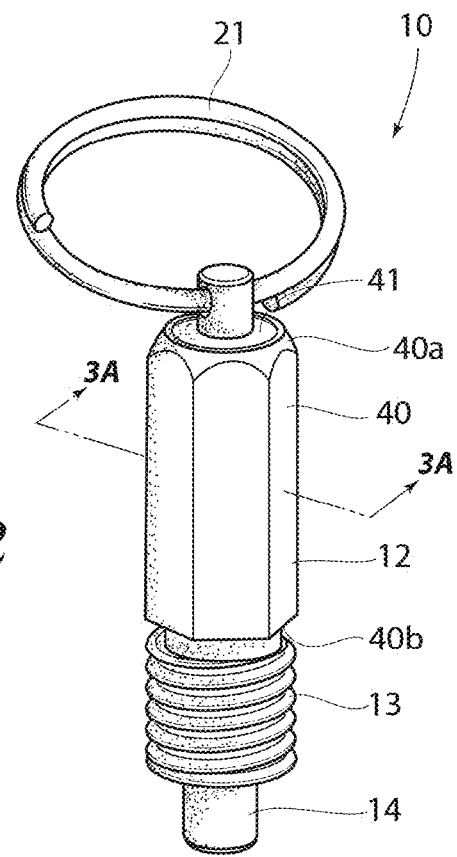
FIG. 2 is a perspective view of a first embodiment of a forward locking pull pin according to the present invention.

FIG. 1 shows a prior art pull pin 100 discussed above. As shown, the pull pin 100 is biased in a forward direction by spring 112. Just as the pin shaft 114 can be retracted by pulling on ring 116, so too can the shaft 114 be retracted by a pushing force directly on pin shaft 114. The prior art pull pin 100 has no mechanism to retain the pull pin shaft 114 in the forward position shown in the figure, therefore allowing other forces to act on pin shaft 114 and potentially release the pull pin accidentally.

FIGS. 2 and 3A-3C show one embodiment of the forward locking pull pin 10 according to the present invention. As shown, the pull pin 10 may have a housing 12, a pull pin shaft 14 nested within the housing 12, and an inner shaft 16 nested within the pull pin shaft 14, a first spring 18, a second spring 19, a pull mechanism 20, and ball bearings 30. The housing 12 is a generally hollow, cylindrical housing. The housing 12 has a main body 40 having an upper end 40a and a lower end 40b. The main body 40 may have a generally hexagonical cross section. The upper end 40a may be configured such that a portion of either the pull pin shaft 14, inner shaft 16, or both, including the pull mechanism 20 may extend therethrough in order to allow the user to manipulate the pull pin 14. In the embodiments shown, the upper end 40a is substantially open for receiving a washer 41 that provides the enclosure of the main body 40, described in more detail below. The housing 12 may also have an engagement section 13 coupled to the lower end 40b. The engagement section 13 provides means by which the pull pin 10 may be engaged into a hole in a first material (not shown) as described above. In the embodiment shown, the engagement section 13 comprises external threads that may be joined to threads formed in the hole of a first material. In one embodiment, the engagement section 13 has a diameter that is less than the diameter of the main body section 40. The housing is configured such that the pull pin shaft 14 extends through an opening at the end of the threaded section 13, and may be extended into a hole on a second material (not shown).

Figure 3:
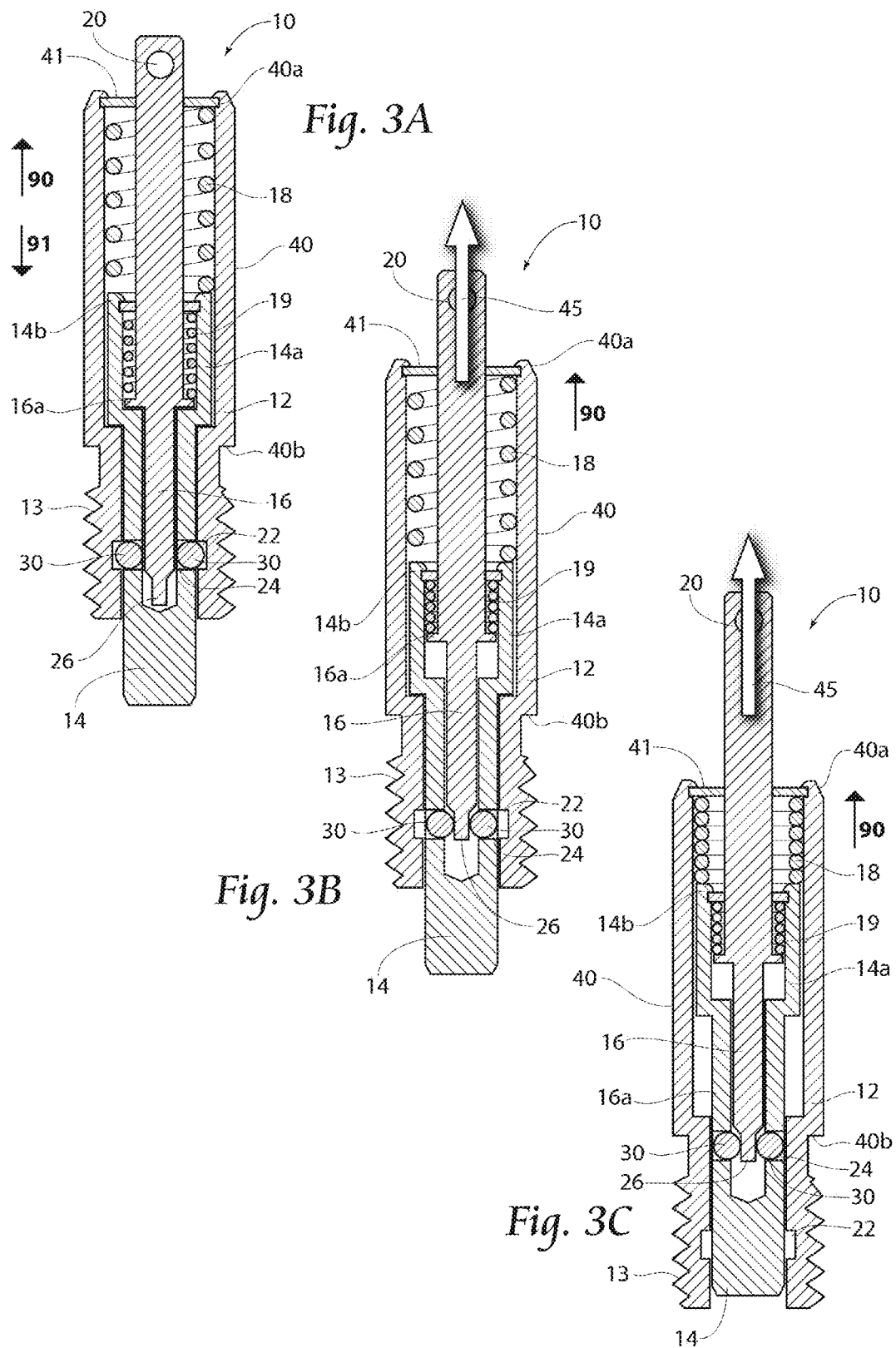
FIGS. 3A-3C are cross-sectional views of the embodiment of a forward locking pull pin shown in FIG. 2.
Figure 4:
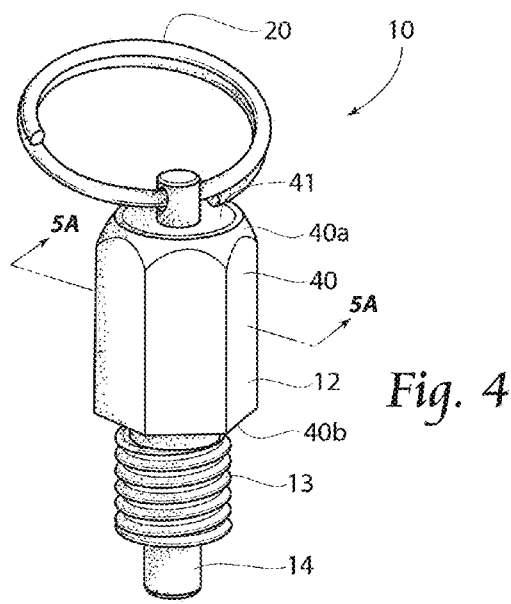
FIG. 4 is a perspective view of a second embodiment of a forward locking pull pin according to the present invention.
Figure 5A:
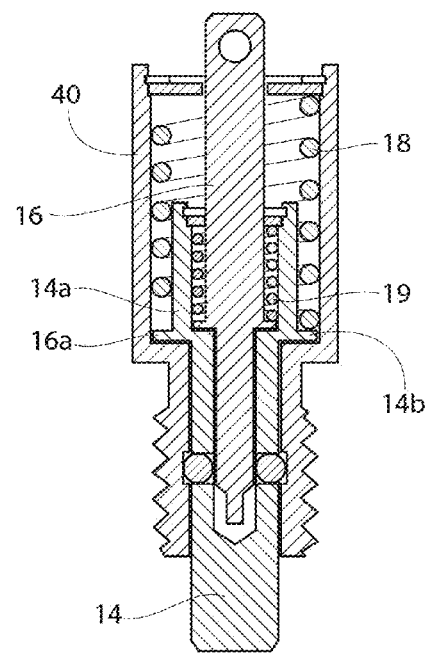
FIGS. 5A-5C are cross-sectional views of a second embodiment of a forward locking pull pin according to the present invention.
Figure 5B:
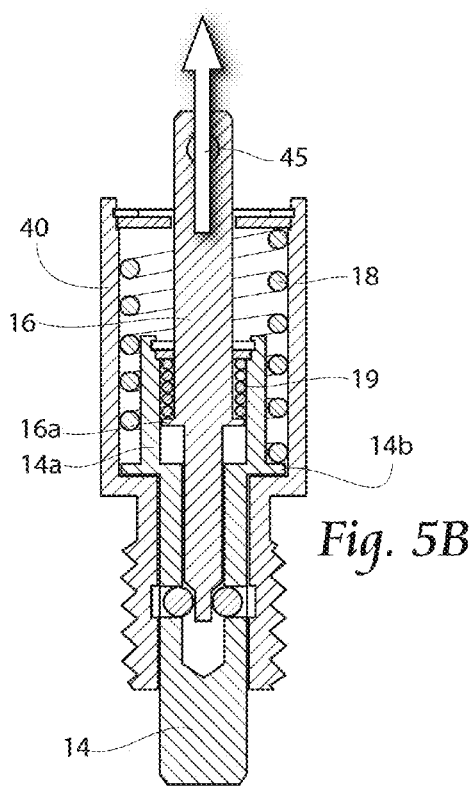
Figure 5C:
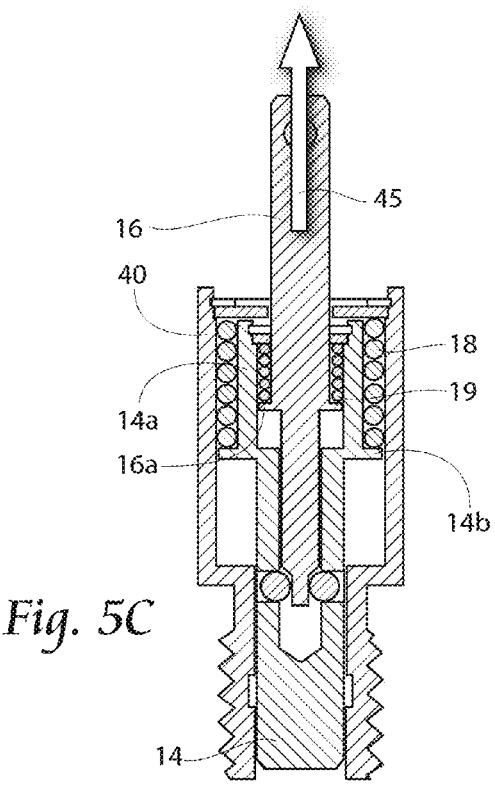
Figure 6:
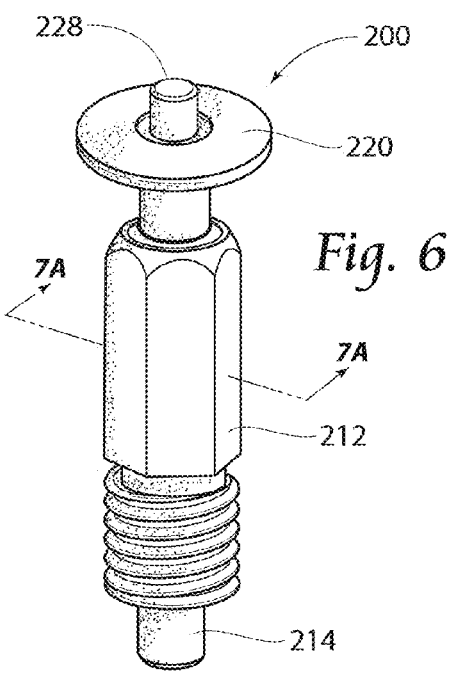
FIG. 6 is a perspective view of a third embodiment of a forward locking pull pin according to the present invention.

FIG. 3A shows one embodiment of the present invention in the forward locked position provided by the invention. First spring 18 biases pull pin shaft 14 in the forward direction 91 and second spring 19 biases the inner shaft 16 in the forward direction 91. In this embodiment, the springs 18 and 19 are in a stacked relationship to one another. In this configuration, first spring 18 may be positioned within the main body 40 above a top end 14b of the upper portion 14a of the pin shaft 14, configured to be acted on by the top end 14b of the pin shaft 14. Top end 14b may be enclosed in similar fashion as the top end 40a of the main body portion 40, discussed in more detail below. Second spring 19 may be positioned within the upper portion 14a of pin shaft 14, below the top end 14b, configured to be acted on by a ledge 16a formed on the inner shaft 16.

As shown, an inner surface of the housing 12 has a locking space or groove 22 to hold ball bearing 30, when in a locked position. Preferably, two ball bearings 30 and two locking spaces or one groove 22 are provided, oppositely disposed from the other. Aligned with the locking spaces or groove 22 of the housing 12 are ball apertures 24 in the pull pin shaft 14, extending therethrough. As shown in FIG. 3A, the ball bearing has a diameter that is greater than the depth of the locking space or groove such that the ball bearing 30 is positioned partially in both the locking spaces or groove 22 and ball apertures 24 thereby prohibiting the movement of pin shaft 14 in the retracted direction 90, thereby locking the pull pin 10 in the forward direction 91 when no pulling force 45 (depicted in FIG. 3B) is exerted on the pulling mechanism 20. Although it is preferred that the radius of ball bearing 30 be greater than the depth of the locking space or groove 22, it is contemplated that the diameter of the ball bearing 30 may be greater than the depth of the locking space or groove 22 and may still accomplish the intended result of locking the pull pin shaft 14.

The inner shaft 16 may have a narrowed ball release portion 26 that may narrow the inner shaft 16 about the whole circumference of the inner shaft 16, or the ball release portion 26 may be indented sections radially aligned with the ball apertures 24 located on the pin shaft 14. In this embodiment, the ball release portion 26 is located on the pin shaft 16 below the ball apertures 24 when in the forward lock position (shown in FIG. 3A), such that the ball bearings 30 are released when the inner shaft 16 is moved in the retraction direction 90. As shown in FIG. 3B, when a pulling force 45 is applied to the pull mechanism 20 on the inner shaft 16, such as pull ring 21, the second spring 19 is compressed and the ball release portion 26 moves up into alignment with the ball apertures 24, allowing the ball bearings 30 to fall into the ball release portion 26. As such, the ball bearings 30 are now held within the ball aperture, adjacent to the ball release portion 26, and free from the locking space 22. Having released the ball bearings 30 from preventing the upwards movement of the pin shaft 14, the continued pulling force 45 then compresses the first spring 18 and the pin shaft 14 may be retracted, as shown in FIG. 3C. When the pulling force 45 is removed, the biasing force of first spring 18 pushes the pin shaft 14 downward to extend past the housing 12 and second spring 19 pushes the inner shaft 16 downwards, thereby pushing the ball bearings 30 back into the locking space 22 and locking the pin shaft 14 into the original, forward position (shown in FIG. 3A).

FIGS. 4 and 5A-5C show an alternative embodiment of the forward locking pull pin 10 according to the present invention. This embodiment is similar to the embodiment shown in FIGS. 3A-3C except for the configuration of the pin shaft 14 and the springs 19, 18, and the overall height of pull pin 10. In this embodiment, the pin shaft 14 is configured such that the upper portion 14a extending into the main body 40 portion of the housing 12 is spaced apart from the main body 40 inner surface. As such, the first spring 18 may be positioned around the pin shaft 14, instead of above the pin shaft 14 as in the previous embodiment. The first spring 18 is acted upon by a ledge 14b extending out from the pin shaft. As with the previous embodiment, the second spring 19 may be contained within the pin shaft 14 and is acted upon by a ledge 16a on the inner shaft 16. As such, in this embodiment, the springs 18 and 19 are nested one inside the other, rather than stacked as in the previous embodiment, thereby decreasing the overall height of the pull pin 10 that is necessary to house the two springs. This embodiment of pull pin 10, although configured differently, functions the same as the previous embodiment.

FIGS. 6 and 7A-7C show an alternative embodiment of the forward locking pull pin 200 according to the present invention. As with the previous embodiments, the pull pin 200 may have a housing 212, a pull pin shaft 214 nested within the housing 212, and an inner shaft 216 nested within the pull pin shaft 214, a first spring 218, a second spring 219, a pull mechanism 220, and ball bearings 230. This embodiment may also have a release mechanism 228.

Figure 7A:
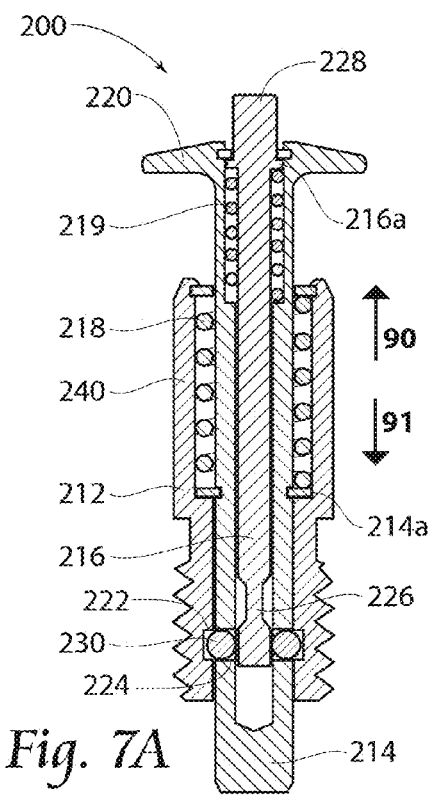
FIGS. 7A-7C are cross-sectional views of the third embodiment of a forward locking pull pin according to the present invention shown in FIG. 6.

FIG. 7A shows this embodiment of the present invention in the forward locked position. First spring 218 biases pull pin shaft 214 in the forward direction 91 and second spring 219 biases the inner shaft 216 in the retraction direction 90. In this configuration, first spring 218 may be positioned within the main body 240 around the pin shaft 214 and above a ledge 214a extending outwardly from the pin shaft 214, and configured to be acted upon by the ledge 214a. Second spring 219 may positioned within the pin shaft 214, around the inner shaft 216 and configured to be acted upon by a flange 216a extending outwardly from the inner shaft 216.

As shown, an inner surface of the housing 212 has a locking space 222 to hold ball bearing 230, when in a locked position. Preferably, two ball bearings 230 and two locking spaces 222 are provided, oppositely disposed from the other. Aligned with the locking spaces 222 of the housing 212 are ball apertures 224 in the pull pin shaft 214, extending therethrough. As shown in FIG. 7A, the ball bearing 230 may have a radius that is greater than the depth of the locking space 222 such that the ball bearing 230 is positioned partially in both the locking spaces 222 and ball apertures 224 thereby prohibiting the movement of pin shaft 214 in the retracted direction 90, thereby locking the pull pin 200 in the forward direction 91. Although it is preferred that the radius of ball bearing 230 be greater than the depth of the locking space 222, it is contemplated that the diameter of the ball bearing 230 may be greater than the depth of the locking space 222 and may still accomplish the intended result of locking the pull pin shaft 214.

Figure 7B:
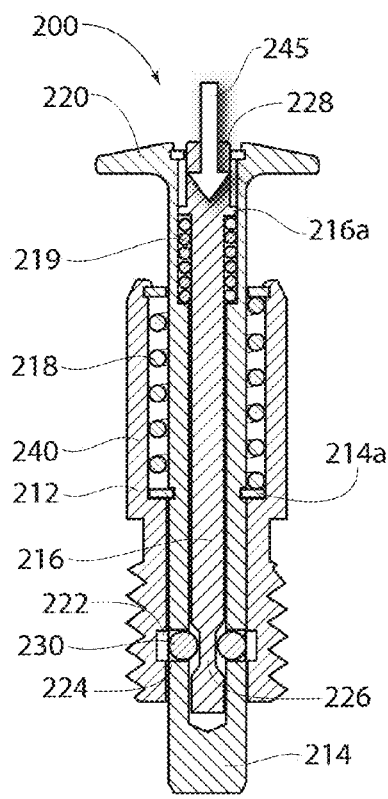
Figure 7C:
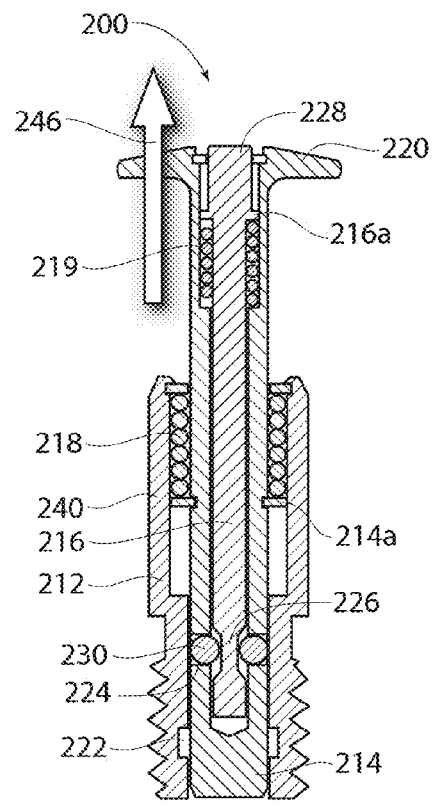

The inner shaft 216 may have a narrowed ball release portion 226 that may narrow the inner shaft 216 about the whole circumference of the inner shaft 216, or the ball release portion 226 may be indented sections radially aligned with the ball apertures 224 located on the pin shaft 214. In this embodiment, the ball release portion 226 is located on the inner shaft 216 above the ball apertures 224 when in the forward lock position (shown in FIG. 7A), such that the ball bearings 230 are released when the inner shaft 216 is pressed in the forward direction 91 via release mechanism 228, such as the push button shown. As shown in FIG. 7B, when a force 245 is applied to the push button 228, which is an extension of the inner shaft 216, the second spring 219 is compressed and the ball release portion 226 moves down into alignment with the ball apertures 224, allowing the ball bearings 230 to fall into the ball release portion 226. As such, the ball bearings 230 are now held within the ball aperture 224, adjacent to the ball release portion 226, and free from the locking space 222. Having released the ball bearings 230 from preventing the upwards movement of the pin shaft 214, the application of a pulling force 246 on the pull mechanism 220 extending outwardly from the pin shaft 214 then compresses the first spring 218 and the pin shaft 214 may be retracted, as shown in FIG. 7C. When the pulling force 246 is removed, the biasing force of the first spring 218 pushes the pin shaft 214 downward to extend past the housing 212. When the pressing force 245 is removed, the second spring 219 pushes the inner shaft 216 upwards, thereby pushing the ball bearings 230 back into the locking space 222 and locking the pin shaft 214 in the original, forward position (shown in FIG. 7A). When both forces 245 and 246 are released simultaneously, the release mechanism 228 does not disengage until the pin shaft 214 is in its forward position and the ball bearings 230 are aligned with the locking spaces 222 (as a result of the biasing force of first spring 218), at which point the biasing force of second spring 219 moves the inner shaft 216 upwards and the ball bearings 230 are forced back into locking spaces 222.

FIGS. 8 and 9A-9C show an alternative embodiment of the forward locking pull pin 200 according to the present invention. This embodiment is similar to that shown in FIGS. 6 and 7A-7C except that when in the forward locked position (as shown in FIG. 9A) the top of the inner shaft 216 forming the release mechanism 228 lies flush with the top of the pull mechanism 220 and therefore, requires the use of a separate tool 250 to provide the pressing force 245 on the inner shaft 216 to unlock the pull pin 200, and thereby allow retraction of the pin shaft 214, as discussed above with relation to the embodiment of FIG. 6.

Figure 10A:
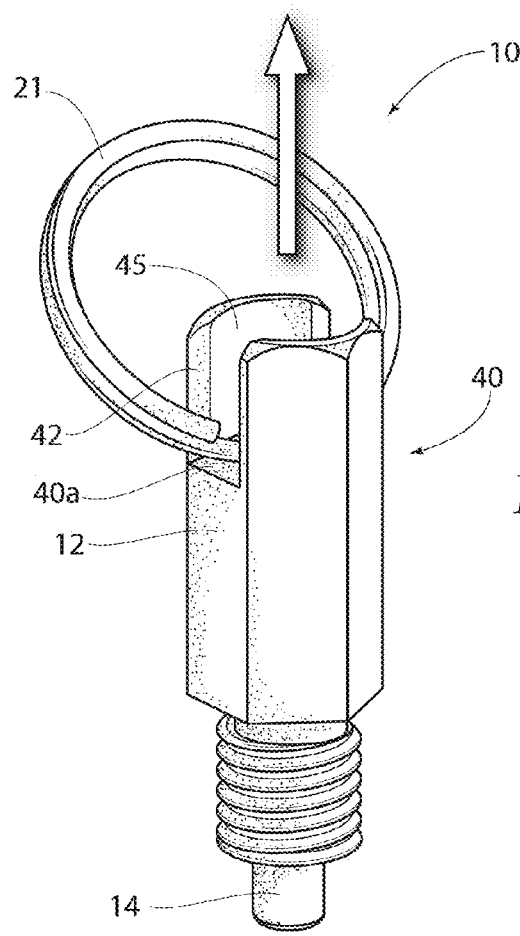
FIGS. 10A-10B are perspective view of a fifth embodiment of a forward locking pull pin according to the present invention.
Figure 10B:
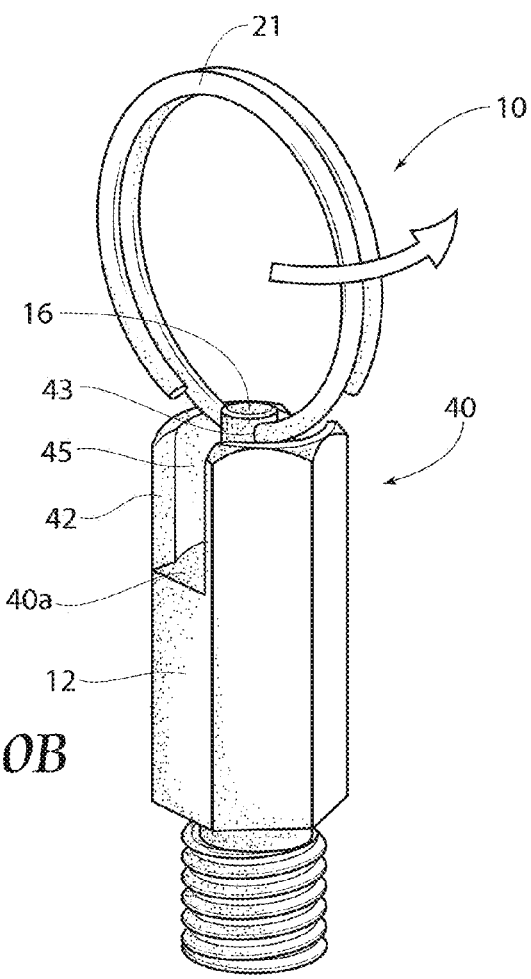

The forward locking pull pin 200 may also have a retracted position locking means 40. FIGS. 10A and 10B show one possible embodiment of a pull pin 10 having retracted position locking means 40. In the embodiment shown, the retracted position locking means 40 is provided by an extended portion 42 on main body 40 of the housing 12. The extended portion 42 extends beyond the enclosed, upper end 40a of the main body. The extended portion 42 may be generally cylindrical in shape. The pull mechanism, such as pull ring 21, may be configured to accommodate twisting, as shown, such that once the pull pin shaft 16 is fully retracted and the pull mechanism twisted, the pull mechanism is then positioned such that the pull ring 21 or other pull mechanism, such as a pull bar, is prohibited from being moved downward into its original position due to the presence of the extended portion 42 of the main body 40 blocking downward movement. In the embodiment shown, the pull ring 21, which passes through opening 43 in pull pin shaft 16, is twisted and overlaps the extended portion 42, therefore preventing the pull pin shaft 16 from going back to its original position. In this embodiment, the extended portion 42 may have at least one slot 45 through which the pull ring 21 or other pull mechanism may extend when in the forward locked position (as shown in FIG. 10A) since. For ease of use, the width or diameter of the pull mechanism 20 must be greater than the diameter of the extended portion 42.

Figure 11A:
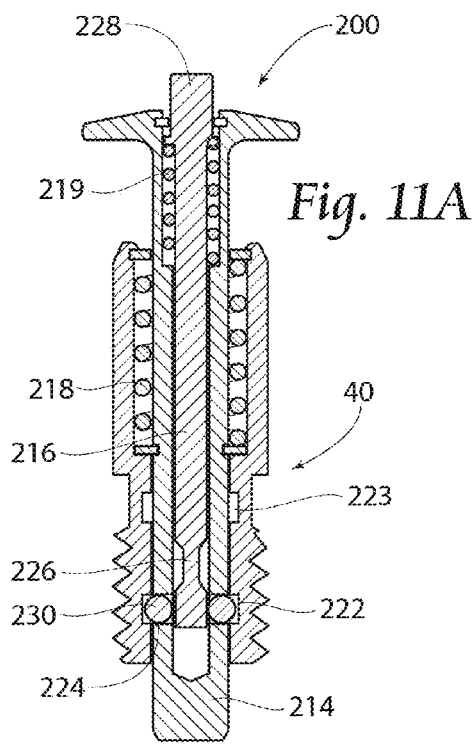
FIGS. 11A-11D are cross-sectional views of a sixth embodiment of a forward locking pull pin according to the present invention.
Figure 11B:
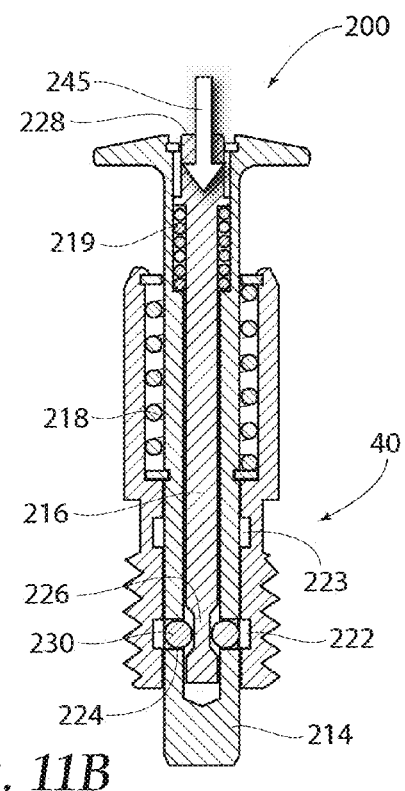
Figure 11C:
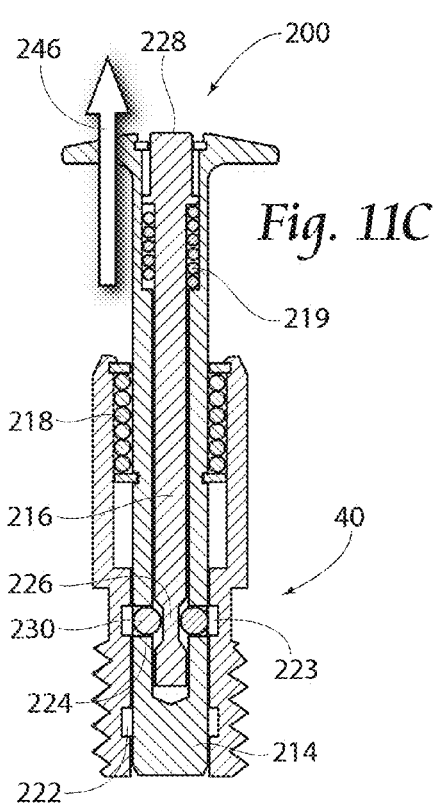
Figure 11D:
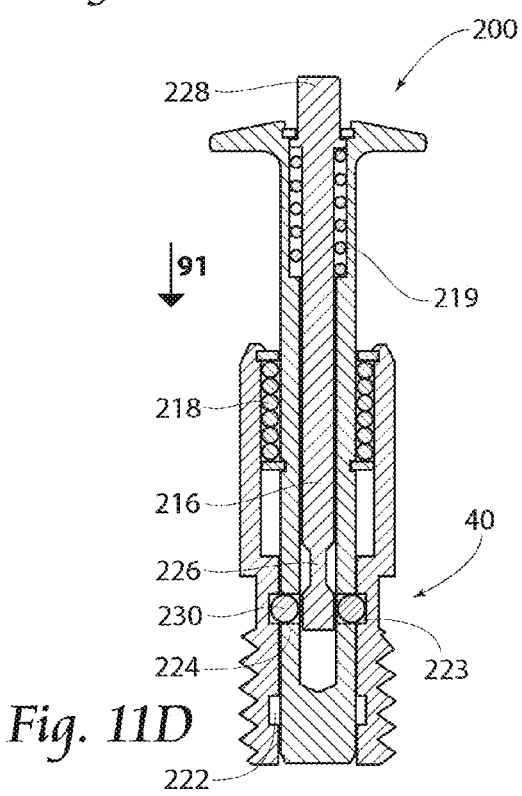

FIGS. 11A-11D show another possible embodiment having means 40 for locking the pull pin 200 in the retracted position shown in FIG. 11D. This embodiment may be similar in design and functionality to that shown in FIGS. 6 and 7A-7C, and described above, except for the addition of a second set of locking spaces 223 positioned in radial alignment with the location of the ball apertures 224 and ball release portion 226 when the pull pin shaft 214 is in a fully retracted position, as shown in FIG. 11C. As such, when in the fully retracted position as a result of pushing force 245 and pulling force 246 (as described with relation to FIGS. 6 and 7A-7C), and upon the release of the pushing force 245 as depicted in FIG. 11D, the biasing force of second spring 219 forces the inner shaft 216 upwards and forces the ball bearings 230 into the second set of locking spaces 223. The presence of ball bearing 230 positioned partially in both the second locking space 223 and ball apertures 224 prohibits the movement of pin shaft 214 in the forward direction 91, thereby locking the pull pin 200 in the retracted position. The retracted locking position can be released by reapplying the pressing force 245 to the release mechanism 228 thereby allowing ball bearings 230 to fall into the ball release portions and the pin shaft is then forced, by the biasing force of first spring 218, back into its forward position.

Figure 12:
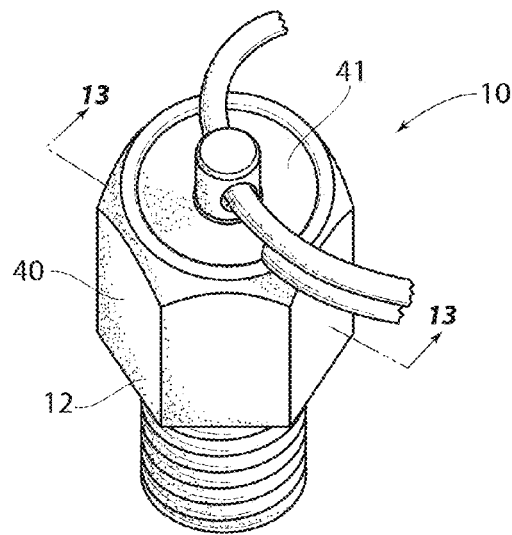
FIG. 12 is a perspective view of a top portion of a forward locking pull pin according to the present invention.
Figure 13:
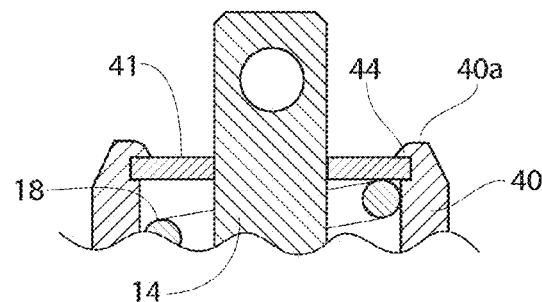
FIG. 13 is a partial cross-sectional view of the forward locking pull pin shown in FIG. 12.

FIGS. 12 and 13 show a first embodiment for enclosing the main body portion 40 of the housing 12. As shown, the upper end 40a of the body portion 40 may be swedged or deformed to bend slightly inward toward the center of the cylindrical body 40. The deformed upper end 40a can thereby hold a washer 41 which provides the means for enclosing the housing 12 and retaining the first spring 18 within the housing, providing the opposing force which allows for the biasing of the pin shaft 14. The deformation of the upper end 40a, as shown in FIGS. 12 and 13, may be achieved after the pull pin 10 or 200 has been constructed. The washer 41 is placed in the open upper end 40a of the body 40 and the upper end may be subjected to a strong, abrupt pressing force which deforms the upper end 40a, thereby creating the inward bending lip 44 that secures the washer 41 in place.

Figure 14:
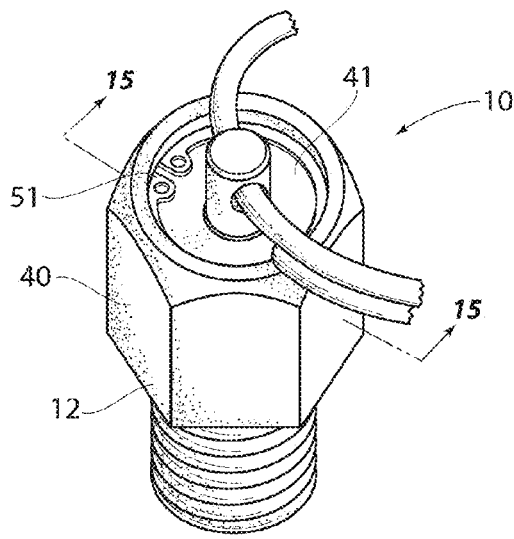
FIG. 14 is a perspective view of a second embodiment of a top portion of a forward locking pull pin according to the present invention.
Figure 15:
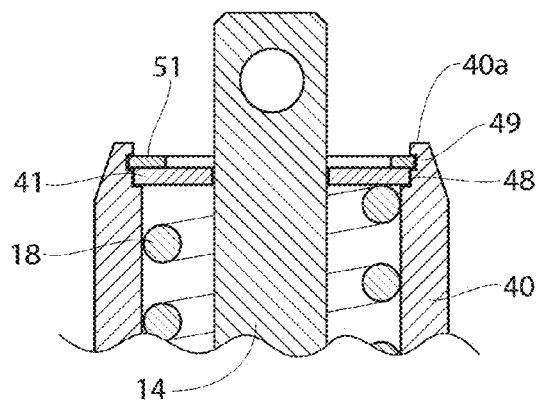
FIG. 15 is a partial cross-sectional view of the forward locking pull pin shown in FIG. 14.

As shown in FIGS. 14 and 15, the upper end 40a may accommodate a snap ring, internal retaining ring or other retaining device 51 which retains the washer in the main body. As shown, the washer 41 may be placed on a step 48 created in the inner surface of the main body 40. The snap ring 51 device may then be placed atop the washer 41 and within a groove 49, formed in the inner surface of the main body 40 near the top end 40a, having a diameter that is greater than the diameter formed by the step 48 of the main body 40 and the washer 41. Use of an external tool is used to reduce the diameter of the snap ring 51 for introduction into the groove 49 and also for removal from the groove 49 when necessary for servicing or otherwise disassembling the pull pin 10 or 200.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A forward locking pull pin comprising:
 a housing, said housing comprising an engagement portion and a body portion, said housing being substantially hollow, said housing having an inner surface, an outer surface, a top end surface and a bottom end surface, each of said top end surface and said bottom end surface having an opening formed therein;
 a pull pin shaft, wherein at least a portion of said pull pin shaft is contained within said housing and at least a second portion extends through said opening in said bottom end surface of said housing;
 an inner shaft, wherein at least a portion of said inner shaft is contained within said pull pin shaft and at least a second portion extends through said opening in said top end surface of said housing;
 a first biasing means positioned within said housing for biasing said pull pin shaft in a forward direction, said forward direction being in opposition to a retraction direction;
 a second biasing means positioned within said pull pin shaft for biasing said inner shaft;
 a pull mechanism coupled to said inner shaft and configured to allow manipulation of said pull pin shaft in said retraction direction; and at least one ball bearing contained within said housing between said top end surface and said bottom end surface;

said inner surface of said housing having at least one locking space formed therein, capable of holding at least a portion of said at least one ball bearing;

said pull pin shaft having at least one ball aperture formed therethrough, configured such that when said pull pin shaft is in a first forward position, said at least one ball aperture is radially aligned with said at least one locking space and capable of holding at least a second portion of said at least one ball bearing, thereby locking said pull pin shaft in said first forward position;

said inner shaft having a ball release section located adjacent said ball aperture; and wherein said pull pin is configured such that an external force applied to said inner shaft, in a direction opposing said second biasing means, moves said ball release section into vertical alignment with said at least one ball aperture, allowing said ball bearing to move into said ball release portion and out of said at least one locking space, and thereby allowing said pull pin shaft to more into at least a second retracted position.

2. The pull pin of claim 1 further comprising at least a pair of said locking spaces, at least a pair of said ball apertures, at least a pair of said ball release portions, and at least a pair of said ball bearings.

3. The pull pin of claim 1 wherein said at least one locking space comprises a groove.

4. The pull pin of claim 1 wherein said engagement portion has a diameter that is less than the diameter of said body portion.

5. The pull pin of claim 1 wherein said body portion has a hexagonal cross-section.

6. The pull pin of claim 1 further comprising a washer covering said opening in said top end surface of said housing.

7. The pill pin of claim 6 wherein said washer is retained in position by swedged portion of said top end surface of said housing.

8. The pull pin of claim 6 wherein said washer is retained in position by a circlip positioned atop said washer and engaged in a groove formed in said inner surface of said housing near said top end.

9. The pull pin of claim 1 wherein said first biasing means is positioned above said pull pin shaft containing said second biasing means such that the biasing means are in a stacked configuration relative to one another.

10. The pull pin of claim 1 wherein said first biasing means is positioned around said pull pin shaft containing said second biasing means, such that the biasing means are in a nested configuration relative to one another.

11. The pull pin of claim 1 wherein said second biasing means biases said inner shaft in said forward direction and said external force is applied in said retraction direction.

12. The pull pin of claim 11 by said ball release portion of said inner shaft is located vertically below said ball aperture of said pull pin shaft, such that when said external force is applied, said ball release portion aligns with said ball aperture.

13. The pull pin of claim 1 wherein said second biasing means biases said inner shaft in said forward direction and said external force is applied in said retraction direction to overcome at least a portion of said biasing of said inner shaft by said second biasing means.

14. The pull pin of claim 13 wherein said ball release portion of said inner shaft is longitudinally offset from said ball aperture of said pull pin shaft, such that when said external force is applied to said inner shaft, said ball release portion aligns with said ball aperture.

15. The pull pin of claim 13 wherein said pull pin shaft is moved in said retraction direction by a second external force applied to said pull pin shaft in said retraction direction to overcome at least a portion of said biasing of said pull pin shaft by said first biasing means.

16. The pull pin of claim 13 wherein said pull pin shaft is moved in said retraction direction by a second external force applied to said inner shaft in said retraction direction to overcome at least a portion of said biasing of said pull pin shaft by said first biasing means and to overcome at least a portion of said biasing of said inner shaft by said second biasing means.

17. The pull pin of claim 1 further comprising means for locking said pull pin in a retracted position achieved when said pull pin shaft is moved in said retraction direction.

18. The pull pin of claim 17 wherein said means for locking said pull pin in said retracted position comprises at least one extended portion of said housing extending above said upper end of said main body and wherein said pull mechanism is capable of twistable movement when in said retracted position to situate said pull mechanism vertically above said extended portion, such that said pull mechanism is prohibited by said extended portion from movement in said forward direction.

19. The pull pin of claim 17 wherein said means for locking said pull pin in said retracted positron comprises at least one second locking space formed into said housing such that when said pull pin shaft reaches said retracted position and said external force is removed, said at least one ball bearing moves into said second locking space, thereby preventing movement of said pull pin shaft in said forward direction.

20. The pull pin of claim 1, said engagement portion extending from said bottom end surface of said housing towards said top end surface of said housing and comprising external threads.

* * * * *

UNITED STATES PATENT AND TRADEMARK OFFICE
CERTIFICATE OF CORRECTION

Page 1 of 1

PATENT NO. : 8,821,061 B2
APPLICATION NO. : 13/495263
DATED : September 2, 2014
INVENTOR(S) : Romy Baus It is certified that error appears in the above-identified patent and that said Letters Patent is hereby corrected as shown below:

In the Claims

Column 10, line 1 of claim 12, after "of claim 11" delete "by" and substitute -- wherein --.

Signed and Sealed this
Seventeenth Day of February, 2015

Michelle K. Lee
*Deputy Director of the United States Patent and Trademark Office*